United States Patent [19]
Spitzer Sr.

[11] Patent Number: 5,547,279
[45] Date of Patent: Aug. 20, 1996

[54] STIR-WIPE COOKING VESSELS

[76] Inventor: Harry L. Spitzer Sr., 16318 Rappelo Rd., Brooksville, Fla. 34601

[21] Appl. No.: 515,820

[22] Filed: Aug. 16, 1995

[51] Int. Cl.[6] .................................................. B01F 7/18
[52] U.S. Cl. ................................. 366/251; 99/348
[58] Field of Search ........................... 366/244, 245, 366/247, 248, 249, 250, 251, 252, 254, 312, 309; 99/348

[56] References Cited

U.S. PATENT DOCUMENTS

| | | | |
|---|---|---|---|
| 4,151,792 | 5/1979 | Nearhood | 366/251 |
| 4,856,910 | 8/1989 | Cuchera | 99/348 |
| 5,106,199 | 4/1992 | Eckel | 366/251 |
| 5,201,263 | 4/1993 | Teng | 366/249 |
| 5,372,422 | 12/1994 | Dubroy | 366/143 |

*Primary Examiner*—Robert W. Jenkins
*Attorney, Agent, or Firm*—Charles A. McClure

[57] ABSTRACT

Stir-wipe apparatus in the form of rotatable stirrer means fitting removably in a cooking vessel, being effective together with non-manual drive means to stir the contents slowly and to wipe the sidewall and the bottom of the vessel in doing so. The drive means is conveniently an electric motor located on a lid for the cooking vessel or in a handle of the lid or a handle of the vessel itself.

18 Claims, 3 Drawing Sheets

5,547,279

STIR-WIPE COOKING VESSELS

TECHNICAL FIELD

This invention relates to wiping the interior surfaces of cooking vessels clean in conjunction with stirring the contents thereof.

BACKGROUND OF THE INVENTION

Careful manual mixing of ingredients before and during cooking often is adequate, but it may be precluded by conflicting tasks. Hence, most people have seen the inside surfaces of cooking vessels contaminated, as after tiresomely long periods of required stirring, by part of the contents adherent inside and troublesome to remove, perhaps even charred from inadequate stirring and/or overheating.

Mechanically aided stirrers can reduce the effort, and often also the time, needed to mix ingredients for cooked food products. Such a mixing aid can induce a cook to increase heating temperature in an attempt, maybe misguided, to reduce the cooking time, or may lead to a period of inattention and consequent overexposure. Hence, sticking or burning of some of the contents on the sidewall or the bottom of cooking vessels may occur and prove difficult to remove, or may even contribute an undesirable flavor to the cooked product.

Other persons have devoted attention to stirring of ingredients in cooking vessels but with diverse results not overly far-reaching. Thus, in Lambert U.S. Pat. No. , 3,810,605 discloses a motor inside an auxiliary handle adapted to be retained on the top edge of a cooking vessel and with stirrer blades on a depending vertical central axle; Klauk U.S. Pat. No. 3,920,228 discloses a large cooking utensil with drive motor underneath to rotate side and bottom "scrapers" on a central axle; Clevenholm U.S. Pat. No. 4,395,133 shows a commercial cooker with a U-shaped stirrer close to but not in contact with either vertical sidewall or concave bottom; and Dubroy U.S. Pat. No. 5,372,422 discloses a removable top with a depending central axle carrying a stirrer blade and optionally an oblique blade with a V-shaped end intended as a bottom scraper.

No single one of these predecessors nor any likely combination of their disclosures meets the need for effective non-stick stirring to which this present invention of mine is successfully directed.

SUMMARY OF THE INVENTION

A primary object of the present invention is to wipe the inside surface of a cooking vessel clean of contents being treated therein.

Another object of this invention is to combine the functions of stirring the contents of a cooking vessel and the function of wiping its surfaces contacted by the stirred contents clean thereof.

A further object of this invention is to perform the stirring and the wiping functions simultaneously.

Yet another object of this invention is to provide apparatus adapted to perform the foregoing functions simply and efficiently.

A still further object of the invention is to provide diverse embodiments of such apparatus to perform such functions.

In general the objects of this invention are attained by wiping the inside surface of a cooking vessel while stirring its contents mechanically rather than manually and, more particularly, by providing the vessel with electromechanical drive means effective to rotate therein rotatable blade means fitting resiliently within the vessel and adapted to wipe its inside surface when rotating.

The objects of this invention can be achieved in an apparatus embodiment having rotatable stirrer means, fitting removably within the vessel, being effective when rotating to stir the contents and to wipe the bottom of the cooking vessel and the vessel sidewall to preselected height. Electromechanical drive means is conveniently mounted, such as overhead on a cover for the vessel, or in a side handle of the cover, or a side handle of the vessel itself, and is effective to rotate the stirring and wiping means. The drive means has a central vertical axle, as does the driven stir-wipe means, in the form of a cage-like horizontal and vertical framework of relatively narrow but rigid rod-like members carrying resilient blades adapted to contact the vessel's inside wall and bottom surfaces. The resilient blades are adapted not only to stir the contents but also to wipe the inside wall and bottom surfaces clean in doing so.

Other objects of this invention, together with methods and means for attaining the various objects, will become apparent from the following description, and the accompanying diagrams of one or more embodiments presented by way of example rather than limitation.

DESCRIPTION OF THE INVENTION

Figure 1:
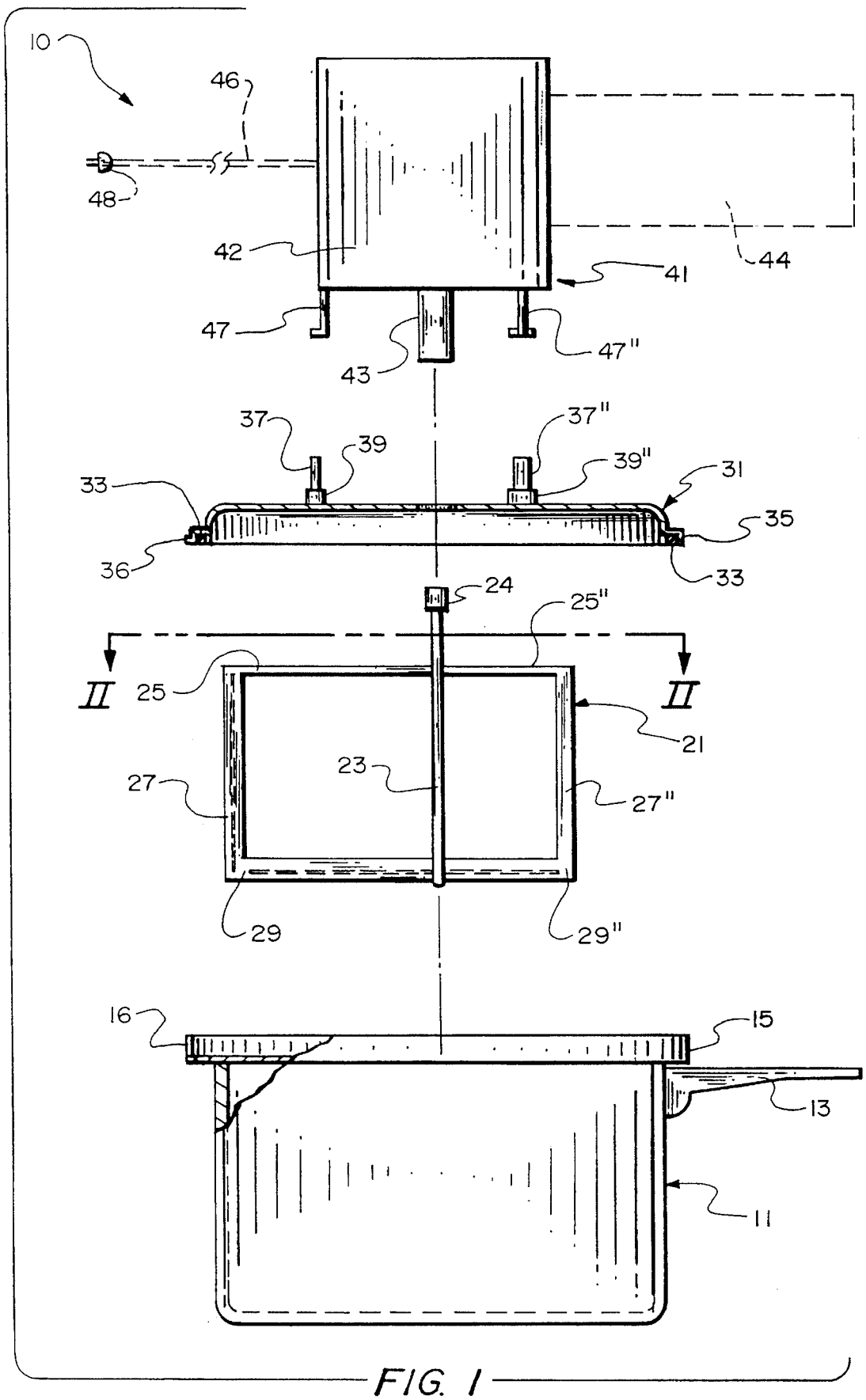
FIG. 1 is a vertically exploded side elevation, of the first embodiment of this invention, in a cooking vessel with cover.

FIG. 1 shows, in vertically exploded side elevation, a first embodiment 10 of this invention, featuring four main components. It will be understood that this composite view of the components is a convenient way of showing them individually while also suggesting how they look together when in their fully assembled configuration. Lowermost is open-top cooking vessel 11 with handle 13 extending to the right from a location just below rim 15 of the vessel and with non-rotation slot 16 in the diametrically opposed part of the rim.

Next upward is stir-wipe cage 21 with vertical axle 23 from the bottom center to drive connector 24 well above the rest of the cage, which itself has radial spoke-like horizontal top members 25, 25', 25" (25' being hidden here behind 25") to several vertical stir-wipe blades 27, 27' (similarly hidden), and 27" depending from the respective spoke ends and at their own bottom ends joining the radially outermost ends of similar spoke-like stir-wipe blades 29, 29', 29".

Next upward in FIG. 1 is horizontal cover 31, which is slightly domed, with downturned rim 35 having circular gasket 33, adapted to fit within rim 15 of vessel 11, and non-rotation boss 36 extending to the left and adapted to mate with the vessel non-rotation slot. Rising from the top of the cover and secured to it, as by bolting or welding of their semicylindrical bases 39, 39' (hidden here by 39), and 39" are three connector members 37, 37' (similarly hidden), and 39" equidistant about drive shaft 43 centered on the vertical axis. Quick-connect-disconnect counterparts 47, 47' (similarly hidden), and 47" of the connector members extend down from the bottom of cylindrical drive means 41 at the top of this view, occupied mainly 12 by motor housing 42. Extending rightward of the motor is optional battery 44 (dashed lines), also conveniently cylindrical, whereas extending leftward is optional electrical cord 46 terminating in plug 48 (both also dashed) for recharging the battery when present.

Assembly of the vertically exploded components is visualizable by mentally collapsing them downward along the axis, to locate stir-wipe cage 21 at rest inside cooking vessel 11, lowering cover 31 until its rim 35 comes to rest inside rim 15 of the vessel, with slot 16 accommodating rim boss 36 to prevent rotation. Drive means 41 is connected to the cover, with drive shaft 43 engaging cage drive connector 24. The order of assembly may be varied, of course, to suit the cook's preference. Description of operation is deferred until description of the rest of the drawing views.

Figure 2:
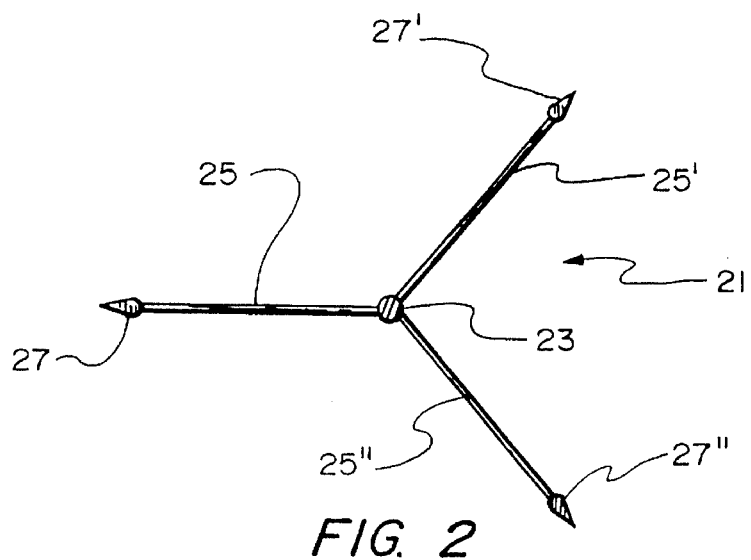
FIG. 2 is a top plan view of a stir-wipe component of FIG. 1, sectioned through its axle, taken at II—II on FIG. 1.

FIG. 2 shows, in plan, spoke-like stir-wipe cage 21, featuring arms 25, 25', 25" radiating outward equiangularly from junction with vertical axle 23 (sectioned at II—II in FIG. 1) shaded for metal. The spokes terminate in radial arrowhead configurations of stir-wipe blades 27, 27', 27" shown and described further in the next view.

Figure 3:
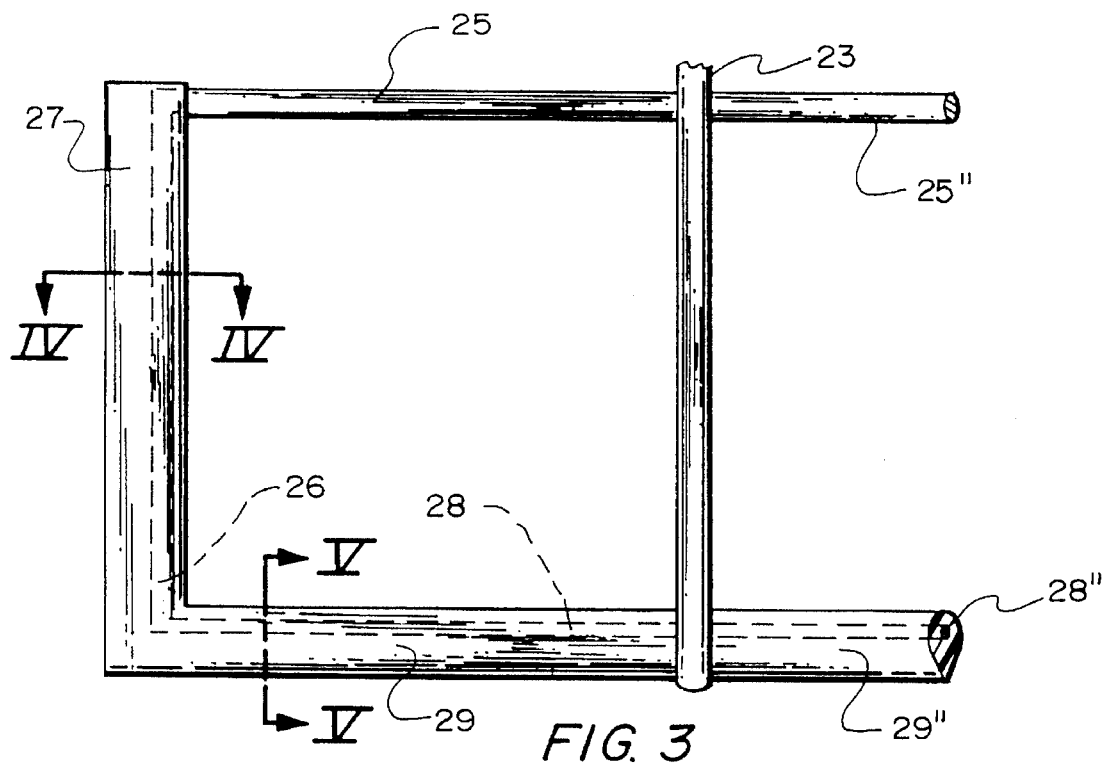
FIG. 3 is an enlarged fragmentary side elevation of the same stir-wipe component shown in both preceding views.

FIG. 3 shows, on an enlarged scale, part of stir-wipe cage 21, from which it is apparent that spoke-like horizontal top member 25 interconnects at its furthest radial extent to vertical rod-like cage member 26 (shown dashed), which in turn connects at its bottom end to horizontal bottom spoke-like member 28 (also dashed) and joined to vertical axle 23. Here upper and lower spoke-like members (shown in FIG. 2) having single-primed reference numerals are not visible, but corresponding horizontal double-primed upper and lower spoke-like cage members 25" and 28" are shown (dashed) attached to vertical axle 23, and otherwise cut away to conserve space. It will be understood that the respective one-third parts of cage 21 are alike except for being displaced equiangularly (120 degrees) about the central axis, itself being occupied by axle 28. The outermost and the bottom rod-like members of the cage have resilient wiper blades formed around them, as is illustrated in the next two views.

Figure 4:
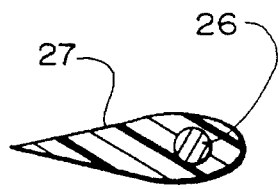
FIG. 4 is a sectional plan through a vertically extending blade of the same stir-wipe component, taken at IV—IV on FIG. 3.

FIG. 4 shows, sectioned transversely in a horizontal plane at IV—IV on FIG. 3, elongated teardrop-shaped wall stir-wipe blade 27 (shaded for plastic) on cage rod-like member 26 (shaded for metal), also representative of blades 27', 27" on respective rods 26', 26".

Figure 5:
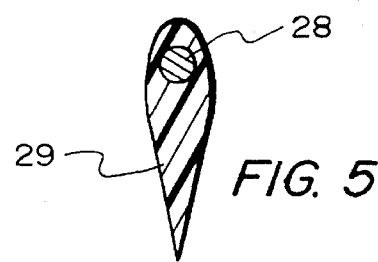
FIG. 5 is a sectional side elevation through a horizontally extending blade of the stir-wipe component, taken at V—V on FIG. 3.

FIG. 5 shows, sectioned transversely in a vertical plane V—V on FIG. 3, elongated teardrop-shaped bottom stir-wipe blade 29 (shaded for plastic) on cage rod-like member 28 (shaded for metal) also representative of blades 29', 29" on respective rods 28', 28".

The symmetrical teardrop cross-sectional shape of the stir-wipe blades enables them to operate effectively, regardless of the direction of rotation (advantageously reversible) about axle 28.

For convenient visual and verbal reference and understanding, whatever adaptation(s) and further embodiment(s) of this invention may appear in additional diagrams and/or description below are given reference numbers differing by one hundred from their counterparts (if any) in the foregoing first embodiment views and description. A new part lacking such a counterpart is assigned a reference number (in its hundred's series) whose other two digits were not so used in such prior series. This conveniently associates similar parts in plural embodiments and permits repetitive description to be avoided.

Figure 6:
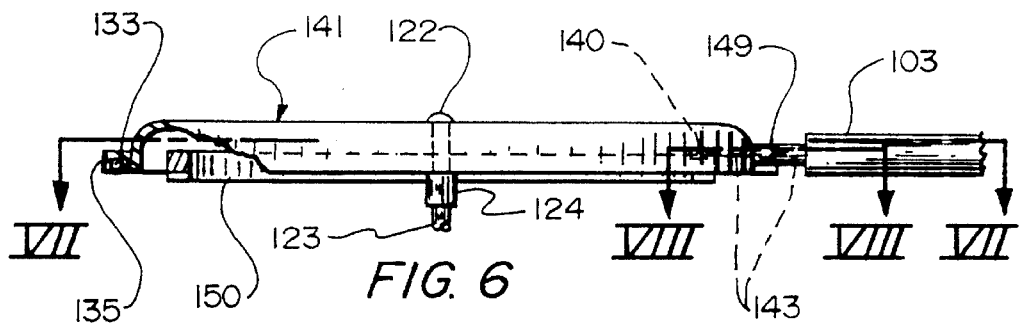
FIG. 6 is a side elevation of a modified embodiment of the cover, including drive means in its handle, similarly useful together with the already illustrated embodiment of cooking vessel.
Figure 7:
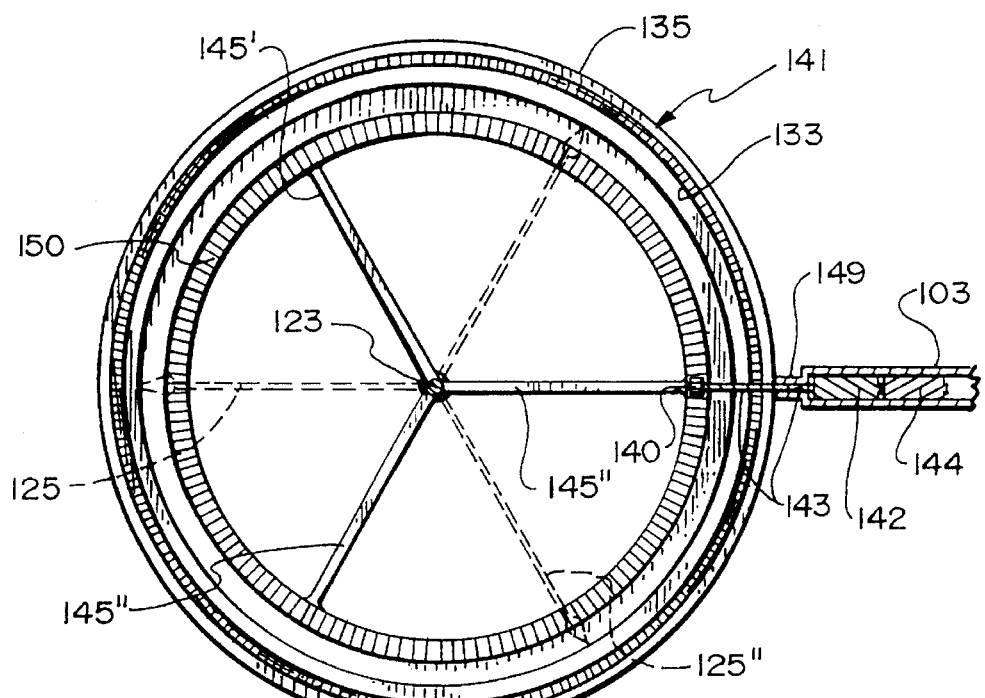
FIG. 7 is a sectional top plan, taken at VII—VII on FIG. 6, with stir-wipe components projected in phantom therebelow.
Figure 8:
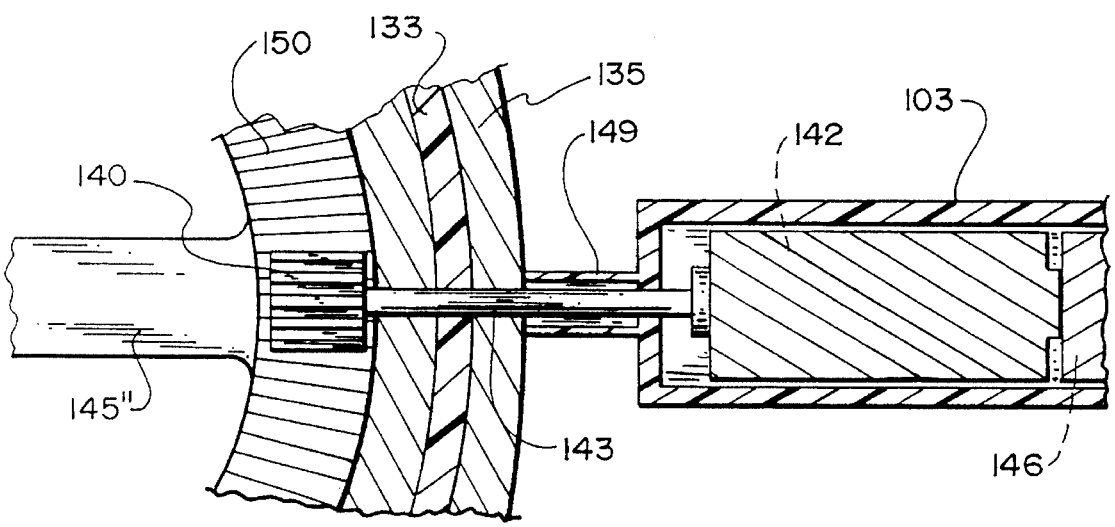
FIG. 8 is a sectional top plan, on an enlarged scale, of drive means and interconnections, taken at VIII—VIII on FIG. 6.

FIGS. 6 and 7 show, in respective side elevation and top plan, added cover embodiment 141 of this invention, FIG. 7 being taken at VII—VII on FIG. 6; whereas FIG. 8 shows, in top plan on an enlarged scale, a portion of the drive arrangement of this added embodiment.

FIG. 6 shows cover 141 for the cooking vessel shown in FIG. 1 (or a similar cooking vessel). Rim 135 and gasket 133 correspond to like elements of the first embodiment. New are axial bushing bolt 122 holding drive fitting 124 shown receiving axle 123 of ring gear 150 visible by cutting away part of cover 141. The cover has handle 103 extending to the right with bushing 149 surrounding horizontal drive shaft 143 extending leftward from motor 142 inside the handle to drive pinion 140 for cover ring gear 150.

FIG. 7 shows cover 141, in top sectional plan (less horizontal top part of the cover sectioned away), as at VII—VII on FIG. 6. Gasket 133 adjoins rim 135, to fit within the cooking vessel rim. Ring gear 150 is supported on spokes 125, 125', 125" equally spaced about the axis and connected to vertical axle 123. Cover handle 103 at the right encloses drive motor 142 and also preferred battery 144. Pinion gear 140 is in engagement with the serrated part of the face of ring gear 150 and is carried on drive motor shaft 143 originating at motor 142. Equiangular spoke-like cage members 125, 125', and 125" (normally not in such a bottom sectional view of the cover) are shown superimposed in phantom (dashed lines) for comparison with, and distinction from, the spokes of the ring gear.

FIG. 8 shows fragmentarily on an enlarged scale the portion of FIG. 7 from the right end of spoke 145" for ring gear 150 to battery 144 within handle 103 at the furthest right. Bushing 149 surrounds motor shaft 143 between the left end of the handle and the right edge of cover rim 135 to retain the handle to the cover as well as to protect the drive shaft from the exterior and to protect a person who might handle the cover while the motor is running. It will be understood that, although the gear surfaces are shown as square-cut, in actuality they are preferably beveled together for smoother fit.

How the apparatus of this invention operates will be apparent from the foregoing description and the accompanying diagrams, in the light of the following commentary. Reference numerals are omitted here as they tend to interfere with the flow of information and are readily ascertainable from what has already been stated.

In the first described embodiment the components are assembled by collapsing the components vertically, as suggested, to locate the stir-wipe cage in the cooking vessel, and to enclose the stir-wipe components by applying the cover to the top of the vessel, with the motor centered on top, and with either a battery or an electric cord connected to provide electrical power to the motor, and preferably with an on/off switch (not shown) present in the electrical circuit. The motor and the cover connectors are interconnected to secure them together. Connection of the motor drive shaft to the stir-wipe cage axle may occur before or during placement of the cover onto the cooking vessel. The weight of the motor (and a battery, if present) secures the cover in place on the vessel. When the electrical power is on, the motor causes the stir-wipe cage to rotate at a slow rate with the resilient stir-wipe blades in contact with the inside wall and bottom surfaces of the vessel. Of course, initial rotation of the stir-wipe means, as in a clockwise direction tends to turn the contents and the cooking vessel likewise but imposes a counter force upon the cover. The rim stop ensures that the cover and the vessel remain fixed relative to one another while the contents are stirred. A desirably slow rotational rate (e.g., several rpm) is assured by use of a DC motor or by reduction gearing of an AC motor. Rotary action of the cage stir-wipe blades stirs the vessel contents, and also wipes the sidewall and bottom, to assure even distribution of ingredients and to prevent overheating, burning, and/or sticking.

Embodiment modifications as shown in the last drawing sheet are useful together in much the same manner as those of the first embodiment, but one such modification may be selected without another. The cover is modified by providing a handle enclosing a drive motor (greatly reduced in size), and optionally a battery (also smaller), and by mounting in the cover a coaxial ring gear nearly as large in diameter to connect conveniently with the motor near the outer edge, incidentally providing a gear reduction for the rotational speed. A rheostat or like speed control is a conventional feature that can be included in the handle, as is a high-temperature cut-off device.

A conventional operational counterpart of the illustrated motor plus battery arrangement in the handle is found in the familiar and readily available drive means of an electrical screwdriver or drill, obtainable from at least several small tool manufacturers. Such a described and illustrated modification of the cover handle may be incorporated in the handle of the cooking vessel itself, instead.

A conventional pressure cooker is modifiable to adopt features described and shown or suggested here so as to provide many or most of the advantages and benefits of this invention. The cage of stir-wipe blades may have as little as a pair of sidewall-engaging blades or may have four or more, but the three blades shown and described here are preferred as more stable in rotation (self-centering) than two and also much easier to clean than any greater number of blades.

This invention enables a cook to provide continual stirring, of whatever is being cooked, automatically and without difficulty. The stir-wipe cage is readily removable for cleaning with minimal waste.

A cook who has had access to this invention in practice will never want to do without it, not only where a long stirring session is foreseeable, but especially for temperature-sensitive foodstuffs where overheating may spoil the taste. Whoever cleans the cooking utensils afterward will appreciate the lack of any charred residue.

Another desirable feature, especially if the cover is not to be used in pressure cooking, is to provide in the top of the cover an opening (preferably coverable, as by hinging, pivoting or sliding) to enable ingredients to be added, and/or the temperature to be checked, without necessity of removing the cover.

Preferred embodiments and variants have been suggested for this invention. Other modifications may be made, as by adding, combining, deleting, or subdividing compositions, parts, or steps, while retaining all or some of the advantages and benefits of the present invention which itself is defined in the following claims.

The claimed invention:

1. Apparatus for use with a cooking vessel having a bottom and a cylindrical sidewall about a vertical central axis, comprising rotatable stirrer means fitting within the vessel and effective when rotating to wipe the sidewall and the bottom of the vessel, and a side handle including non-manual drive means effective to rotate the stirrer means to stir the contents slowly and to wipe the sidewall in so doing.

2. Apparatus according to claim 1, wherein the stirrer means includes a plurality of vertical blades spaced apart at intervals, and fitting against the sidewall of the vessel simultaneously.

3. Apparatus according to claim 2, wherein the stirrer means includes at least one horizontal blade fitting against the bottom of the vessel while the vertical blades fit against the sidewall.

4. Apparatus according to claim 3, wherein the stirrer means includes a vertical axle locatable coincident with the central axis and adapted to support the blades for rotation about that axis.

5. Apparatus according to claim 4, wherein the drive means includes an axle drive gear connectable to the stirrer axle.

6. Apparatus for use with a cooking vessel having a bottom and a cylindrical sidewall about a vertical central axis, comprising rotatable stirrer means fitting within the vessel and effective when rotating to wipe the sidewall and the bottom of the vessel, and including a horizontal ring gear coaxial with the central axis and adapted to support the blades for rotation about that axis; and non-manual drive means effective to rotate the stirrer means to stir the contents slowly and to wipe the sidewall in so doing.

7. Apparatus according to claim 6, wherein the drive means includes a rim drive gear connectable to the stirrer ring gear.

8. Apparatus for use with a cooking vessel having a bottom and a cylindrical sidewall about a vertical central axis and also having a removable cover with side handle, comprising rotatable stirrer means fitting within the vessel and effective when rotating to wipe the sidewall and the bottom of the vessel, and side handle contained non-manual drive means effective to rotate the stirrer means to stir the contents slowly and to wipe the sidewall in so doing.

9. Apparatus according to claim 8, wherein the stirrer means includes a vertical central axle, and the drive means includes a drive motor supported by the cover and including a drive shaft for connection to the axle to rotate it.

10. Apparatus according to claim 8, wherein the drive means includes an electric drive motor with a rechargeable battery to operate the drive motor.

11. Apparatus according to claim 8, wherein the drive means includes an electric drive motor with an extension cord and plug adapted to be plugged into a conventional electrical receptacle.

12. Apparatus for use with a cooking vessel having a bottom and a cylindrical sidewall about a vertical central axis and also having a removable cover, comprising rotatable stirrer means including a horizontal ring gear fitting within the vessel and effective when rotating to wipe the sidewall and the bottom of the vessel, and non-manual drive means effective to rotate the stirrer means to stir the contents slowly and to wipe the sidewall in so doing, including a drive motor supported by the handle, and a drive gear for connection with the ring gear to rotate it.

13. Method for stirring the contents of a cooking vessel mechanically rather than manually, wherein the cooking vessel has an extending side handle attached thereto, comprising the steps of providing rotatable blade means fitting snugly within the vessel and adapted when rotating therewithin to wipe an inside surface of the vessel, rendering the blade means resilient wherever adapted to contact said inside surface off the vessel, and rotating the blade means against the inside of the vessel and thereby stirring the contents and also wiping the contacted surface clean, and fastening to the handle an effective mechanical drive means for the blade means.

14. Method for stirring the contents of a cooking vessel mechanically rather than manually, wherein the cooking vessel has a removable cover with an extending side handle attached thereto, comprising the steps of providing rotatable blade means fitting snugly within the vessel and adapted when rotating therewithin to wipe an inside surface of the vessel, rendering the blade means resilient wherever adapted to contact said inside surface off the vessel, and rotating the blade means against the inside of the vessel and thereby stirring the contents and also wiping the contacted surface clean, and fastening to the cover handle an effective mechanical drive means for the blade means.

15. Method of rotatably driving removable stir-wipe means rotatable about a central vertical axis in a cooking vessel, comprising the steps of providing, for the stir-wipe means, electromechanical drive means mainly outside of the vessel and at least substantially in handle means useful in conjunction with the vessel; and including in the drive means a drive member adapted to make disengageably engageable driving contact with a drive member of the stir-wipe means to rotate the stir-wipe means in the vessel.

16. Method according to claim 15, including the steps of contacting the drive member of the rotatable stir-wipe means just inside the rim of the vessel rather than at the vertical axis, and disengageably engaging said drive member with the drive member of the handle electromechanical drive means.

17. Method according to claim 16, including the steps of locating the handle means with the electromechanical drive means on a removable cover for the vessel, and engaging the respective drive members in mutual contact by placing the removable cover onto the vessel with the removable stir-wipe means inside.

18. Method according to claim 16, including the steps of locating the handle means with the electro-mechanical drive means on the side of the vessel, and engaging the respective drive members in mutual contact by inserting the removable stir-wipe means into the vessel.

* * * * *